A. ZWIEBEL.
Band Cutter.
No. 89,372.  Patented April 27, 1869.
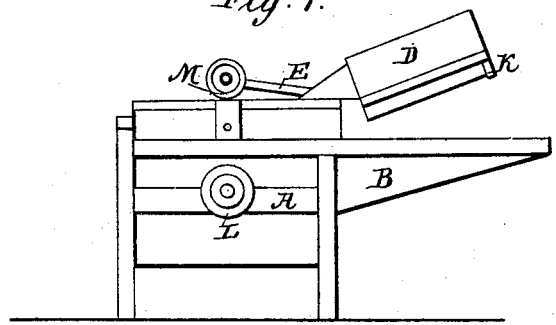
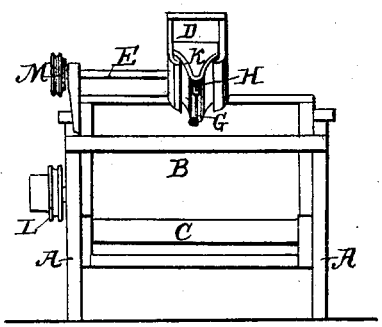
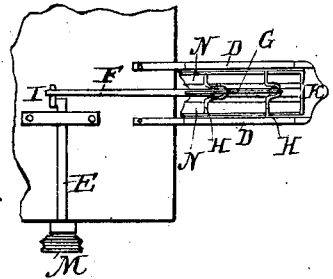
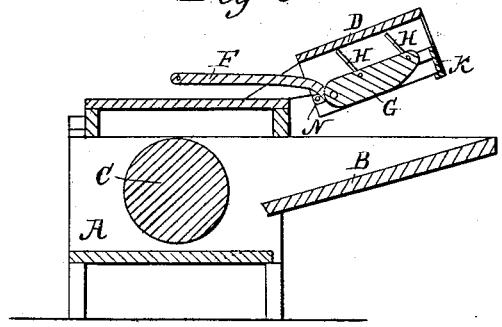
Witnesses.  Inventor.

ANTON ZWIEBEL, OF BURLINGTON, WISCONSIN.

Letters Patent No. 89,372, dated April 27, 1869.

IMPROVEMENT IN BAND-CUTTERS.

The Schedule referred to in these Letters Patent and making part of the same.

*To all whom it may concern:*

Be it known that I, ANTON ZWIEBEL, of the town of Burlington, county of Racine, and State of Wisconsin, have invented a new and useful Improvement in Band-Cutters; and I do hereby declare that the following is a full, clear, and exact description thereof, which will enable those skilled in the art to make and use the same, reference being had to the accompanying drawing, forming part of this specification, in which—

Figure 1 is a side view of my invention.
Figure 2, front view.
Figure 3, a side sectional view.
Figure 4, a top view looking down on to my invention.

Similar letters of reference in each of the figures indicate corresponding parts.

My invention is for cutting the bands of grain when feeding them into a threshing-machine.

A is the frame-work of the machine.

B, the spout for conveying the grain to the cylinder.

C, the threshing-cylinder.

D, a cover and frame for the band-cutter.

E, shaft, with pulley and crank on it with which to operate cutter.

F, handle or pitman from the crank to the cutter.

G, the cutter.

H, hangers, by which the cutter is hung.

I, crank.

K, shield, by which the cutter is covered, hung by a pivot at its back end, and its front end resting on projection in the cover D.

L, pulley on the cylinder.

M, pulley on the shaft E, and by which it is operated.

N, pivot, by which the cutter shield is hung.

Operation.

Put the machine in operation; this will give the cutter a reciprocating motion. Then take a bundle of grain and lay it on the platform, or spout B, under the cutter shield K; this shield will be raised, and the cutter will come down on to the band and cut it off.

What I claim as my invention, and desire to secure by Letters Patent, is—

1. A band-cutter, constructed with frame A, cutter G, hangers H, handle F, crank I, and shaft E, and cover D, arranged substantially as described.

2. Cover D, handle F, cutter G, hangers H, and shield K, arranged substantially as described.

ANTON ZWIEBEL.

Witnesses:
FR. REUSCHLEIN,
H. HECK.